(12) United States Patent
Bao et al.

(10) Patent No.: US 7,756,952 B2
(45) Date of Patent: Jul. 13, 2010

(54) METHOD, SYSTEM, SERVER AND UNIT FOR SETTING CONFIGURATION INFORMATION OF A PRESENTITY CLIENT

(75) Inventors: Hongqing Bao, Shenzhen (CN); Yang Zhao, Shenzhen (CN); Linyi Tian, Shenzhen (CN)

(73) Assignee: Huawei Technologies Co., Ltd., Guangdong Province (CN)

( * ) Notice: Subject to any disclaimer, the term of this patent is extended or adjusted under 35 U.S.C. 154(b) by 546 days.

(21) Appl. No.: 11/690,982

(22) Filed: Mar. 26, 2007

(65) Prior Publication Data

US 2007/0214243 A1 Sep. 13, 2007

Related U.S. Application Data

(63) Continuation of application No. PCT/CN2006/002237, filed on Aug. 31, 2006.

(30) Foreign Application Priority Data

Nov. 9, 2005 (CN) .................. 2005 1 0115658

(51) Int. Cl.
G06F 15/16 (2006.01)
G06F 15/177 (2006.01)
G06F 15/173 (2006.01)
(52) U.S. Cl. .................. 709/220; 709/203; 709/217; 707/3; 707/10
(58) Field of Classification Search ......... 709/217–228, 709/200–203; 707/3, 10; 370/352, 401
See application file for complete search history.

(56) References Cited

U.S. PATENT DOCUMENTS

| 2003/0229687 | A1 | 12/2003 | Ohno et al. |
| 2006/0053208 | A1* | 3/2006 | Laurila et al. ............... 709/206 |
| 2006/0140173 | A1* | 6/2006 | Hoover ....................... 370/352 |
| 2006/0182129 | A1* | 8/2006 | Mutch et al. ................ 370/401 |
| 2007/0010275 | A1* | 1/2007 | Kiss .......................... 455/521 |
| 2007/0270104 | A1* | 11/2007 | Allen et al. .................. 455/78 |

FOREIGN PATENT DOCUMENTS

| EP | 1 734 731 A1 | 12/2006 |
| WO | WO 02/086675 A2 | 10/2002 |

OTHER PUBLICATIONS

International Search Report from corresponding International Application No. PCT/CN2006/002237, filed Aug. 31, 2006, pp. 1-36.

* cited by examiner

Primary Examiner—Haresh N Patel (57) ABSTRACT

A method, a system, a document management server, a presence server and a delegation check processing unit for setting configuration information of a presentity client are used to solve the problem that the setting of configuration information must be done by a presentity client and cannot be delegated to other entities. The method for setting configuration information of a presentity client includes the processes of: determining a configuration request message sent from a configuration request sender is in delegation mode; confirming qualification of the configuration request sender according to delegation setting authorization rules set by the presentity client; and setting the configuration information of the presentity client according to the configuration request message.

20 Claims, 7 Drawing Sheets

METHOD, SYSTEM, SERVER AND UNIT FOR SETTING CONFIGURATION INFORMATION OF A PRESENTITY CLIENT

CROSS REFERENCE TO RELATED APPLICATIONS

This application is a continuation of PCT application number PCT/CN2006/002237, filed Aug. 31, 2006 entitled METHOD, SYSTEM, SERVER AND UNIT FOR SETTING CONFIGURATION INFORMATION OF A PRESENTITY CLIENT, which application is incorporated herein by reference in its entirety.

FIELD OF THE INVENTION

The present invention relates to communication systems, in particular, to a method, a system, a server and a unit for setting configuration information of a presentity client.

BACKGROUND OF THE INVENTION

Presence service is a communication service for publishing and distributing presence information. Many people want to obtain presence information of a presence service subscriber. These people include family members and friends of the presence service subscriber or strangers. However, a lot of presence information belongs to privacy of the presence service subscriber. Therefore, the presence service subscriber needs to set up some strategies to publish the presence information. Such strategies to publish the presence information of presence service subscribers are referred to as subscriber configuration information (preference).

Figure 1:
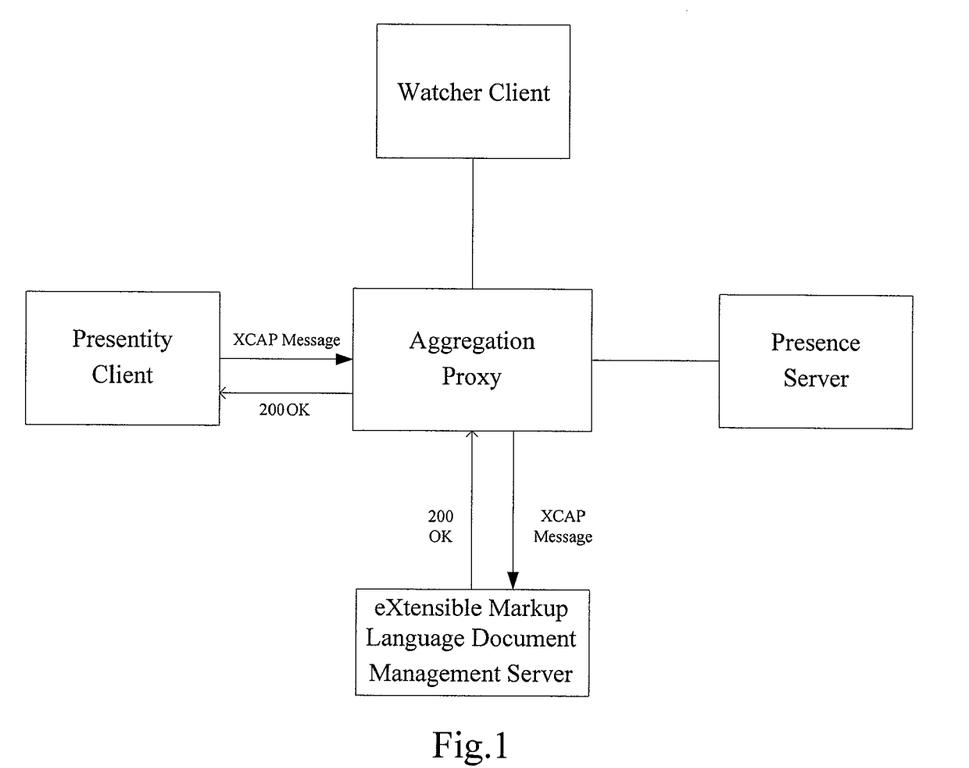
FIG. 1 is a schematic structural diagram of a presence system in the prior art.

In the prior art, configuration information must be set by a presentity client, and there exists no delegation mechanism. Referring to FIG. 1, an existing system includes: a presentity client, a presence server, a watcher client, an XML (extensible Markup Language) document management server (Presence XDMS) and an aggregation proxy. The above components respectively have the following functions.

The presentity client is a presence information source. When the presence information changes, the presentity client sends a publish message to the presence server spontaneously and publishes updated presence information. After processing the publish message (including synthesis, authorization, filtration, etc.), the presence server sends an update notification message to all watcher clients who subscribe to the presence information so that the watcher clients may know the updated presence information.

Based on the existing system, the presentity client may set its configuration information, which includes: (1) modes of publishing the presence information; (2) strategies for publishing different information to different watcher clients; (3) strategies for anonymous watcher clients or unauthenticated watcher clients; (4) strategies for other unspecified subscribers; (5) strategies for a specific watcher client, a specific request or a specific request type; (6) for a watcher client or a watcher client group, strategies defined by a plurality of presentity clients, so that the presence server may know all their presence information, part of their presence information, or other information based totally or in part on their presence information; (7) a mechanism for limiting times a watcher client may retrieve the presence information of a presentity client; (8) default strategies defined by a presentity client and/or an administrator, on each presentity client, each watcher client, each presentity client group or each watcher client group.

The presence server is responsible for receiving a subscription message from a watcher client and determining a subscription result according to preset configuration information of the subscribed presentity client. The presence server is also responsible for receiving a publish message of a presentity client, processing the publish message based on rules (content authorization and filtration) preset by the presentity client or a watcher client, and finally publishing the presence information to the watcher client via an update notification.

The watcher client subscribes to presence information of a presentity client and receives a distributing message from the presence server.

The XML document management server is used to save an authorization list (subscription authorization list, content authorization list, etc.) and/or a group list of presentity clients.

The aggregation proxy is used to have a presentity client or a watcher client interact with a presence server and a presence XDMS to set an authorization list and/or a group list.

Based on the above system, the existing flow for setting the configuration information is as follows:

A presentity client sends a configuration request message for setting its configuration information to an aggregation proxy;

The aggregation proxy forwards the configuration request message to a presence XDMS;

Upon receiving the configuration request message, the presence XDMS sets the configuration information of the presentity client;

The presence XDMS feeds a response message back to the aggregation proxy;

The aggregation proxy feeds the response message back to the presentity client.

However, in some cases, a presence service subscriber may need a delegation mechanism so that a delegated entity may set the configuration information of the presence service subscriber. For example, the cases may be as follows:

1. The presence service subscriber delegates an application to set the configuration information of the presence service subscriber. The application may be a server for providing a public malicious subscriber list which comes from the complaint of presence service subscribers or is obtained in other ways (data mining). In such a case, the presence service subscriber may delegate the application to set configuration information of the presence service subscriber so that malicious subscribers will be refused to subscribe to the presence information of the presence service subscriber.

2. The presence service subscriber delegates another presence service subscriber to set preference information of the presence service subscriber. For example, subscriber A who is not familiar with its working environment may delegate its colleague to set the preference of subscriber A so as to meet requirements of the working environment.

3. The presence service subscriber is in a game scene. According to game logic, the presence information of the presence service subscriber will be set by a game server so as to meet specific requirements of the game logic. For example, a certain game logic requires that the presence service subscriber can only publish all the game-related presence information to teammates of the presence service subscriber, and the presence service subscriber must publish location-related presence information to its enemies, except when the presence service subscriber is wearing an invisible garment, etc.

Therefore, at present, setting of the configuration information must be performed by a presentity client and cannot be delegated to other entities.

As a result, how to provide a method and a system for setting configuration information of a presentity client in a delegation mode is becoming an urgent technical problem.

SUMMARY OF THE INVENTION

Embodiments of the invention provide a method, a system, a document management server, a presence server and a delegation check processing unit for setting configuration information of a presentity client, which are used to solve the problem that the setting of configuration information must be done by a presentity client and cannot be delegated to other entities.

A method for setting configuration information of a presentity client according to an embodiment of the invention includes:

determining a configuration request message sent from a configuration request message sender is in delegation mode;

confirming qualification of the configuration request message sender according to delegation setting authorization rules set by the presentity client;

setting the configuration information of the presentity client according to the configuration request message.

A system for setting configuration information of a presentity client according to an embodiment of the invention includes:

the presentity client, for setting delegation setting authorization rules and delegating a delegated entity to set configuration information of the presentity client;

the delegated entity, for setting configuration information of the presentity client;

a delegation check processing unit, for determining a configuration request message sent from a configuration request sender is in delegation mode, confirming qualification of the configuration request sender according to the delegation setting authorization rules, and setting the configuration information of the presentity client according to the configuration request message.

A document management server according to an embodiment of the invention stores extensible Markup Language (XML) documents configured by a presentity client or a watcher client and the document management server includes: a delegation check processing unit, for determining a configuration request message sent from a configuration request sender is in delegation mode, confirming qualification of the configuration request sender according to delegation setting authorization rules set by the presentity client, and setting the configuration information of the presentity client according to the configuration request message.

A presence server according to an embodiment of the invention includes: a delegation check processing unit, for determining a configuration request message sent from a configuration request sender is in delegation mode, confirming qualification of the configuration request sender according to delegation setting authorization rules set by a presentity client, and setting the configuration information of the presentity client according to the configuration request message A delegation check processing unit according to an embodiment of the invention is used for determining a configuration request message sent from a configuration request sender is in delegation mode, confirming qualification of the configuration request sender according to delegation setting authorization rules set by a presentity client, and setting the configuration information of the presentity client according to the configuration request message.

DETAILED DESCRIPTION

In order that a presentity client may delegate other entities to set configuration information of the presentity client, one embodiment of the invention provides a system for setting configuration information of a presentity client, which includes: a presentity client, a delegated entity and a delegation check processing unit. If the delegated entity lies in a presence service subscriber equipment, the system according to the embodiment of the invention further includes an aggregation proxy.

Figure 2:
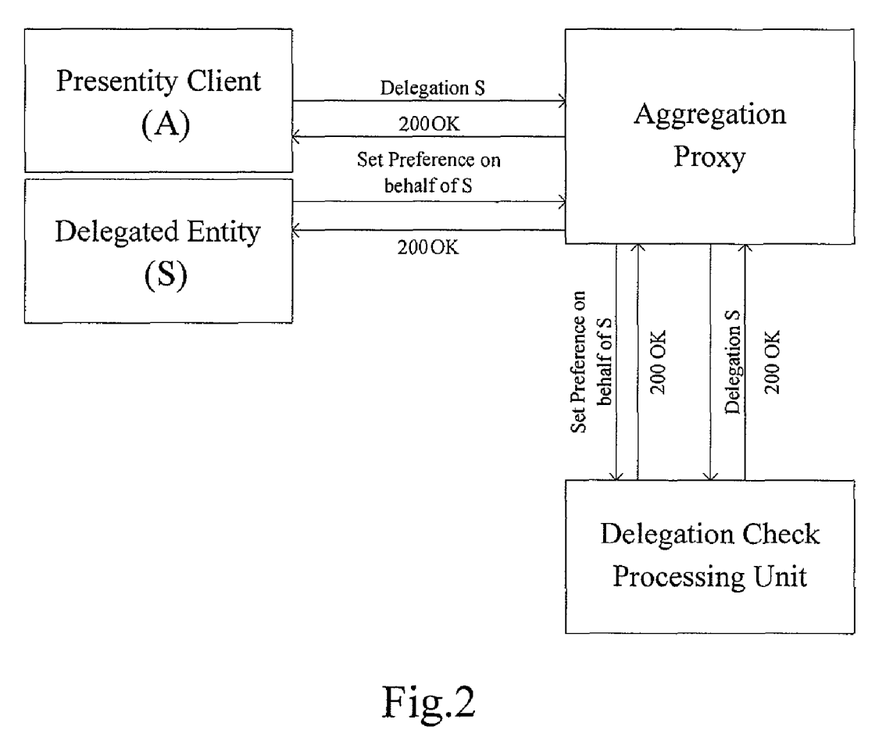
FIG. 2 is a schematic structural diagram of a presence system with an aggregation proxy according to an embodiment of the invention.

If the delegated entity lies in a presence service subscriber equipment, referring to FIG. 2, the presentity client and the delegated entity are in communication with the delegation check processing unit via the aggregation proxy.

Figure 3:
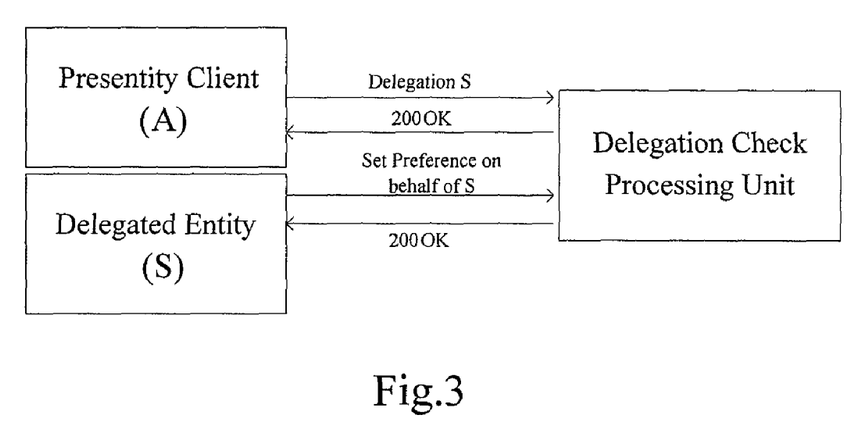
FIG. 3 is a schematic structural diagram of a presence system without an aggregation proxy according to another embodiment of the invention.

If the delegated entity is not within a presence service subscriber equipment (for example, an application server), referring to FIG. 3, the presentity client and the delegated entity are in communication with the delegation check processing unit respectively.

The presentity client is used to set delegation setting authorization rules in the delegation check processing unit and delegate other entities, which are referred to as delegated entities, to set configuration information of the presentity client. (If the delegated entity lies in a presence service subscriber equipment, the presentity client can only set the delegation setting authorization rules in the delegation check processing unit via the aggregation proxy.)

The delegated entity is used for setting configuration information on behalf of the presentity client.

The delegation check processing unit is used for determining whether a configuration request message is in delegation mode when a configuration request message sender sends the configuration request message, and determining the qualification of the configuration request message sender according to prestored delegation setting authorization rules set by the presentity client.

Figure 4:
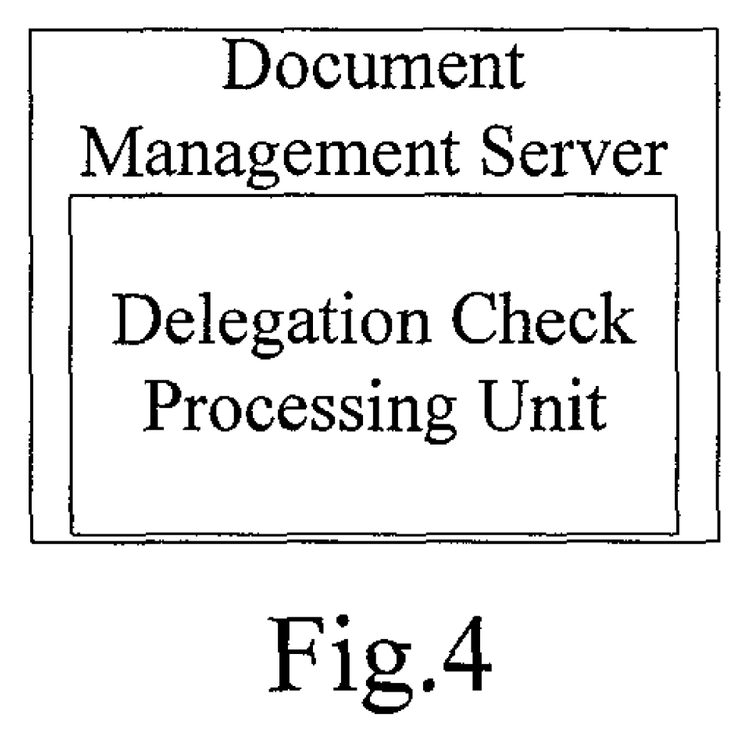
FIG. 4 is a schematic structural diagram of a document management server according to an embodiment of the invention.

According to the location of the delegation check processing unit, referring to FIG. 4, an embodiment of the invention provides a document management server (Presence XDMS) which stores extensible Markup Language (XML) documents configured by a presentity client or a watcher client and includes the delegation check processing unit.

Figure 5:
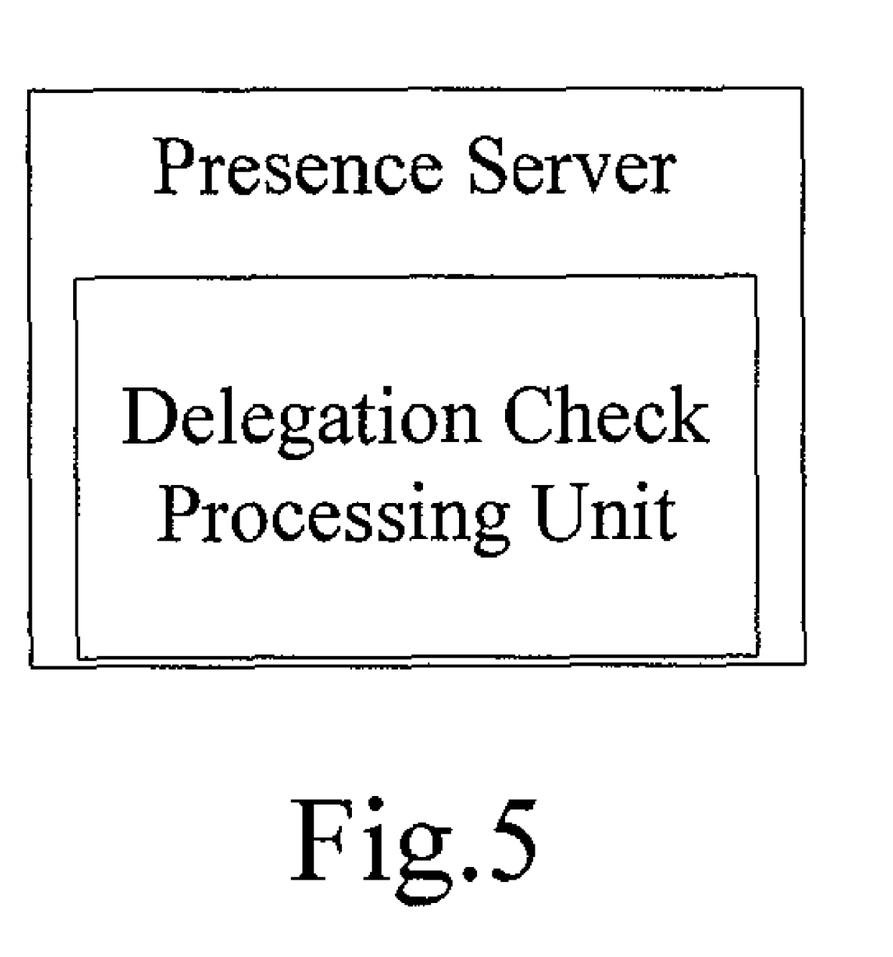
FIG. 5 is a schematic structural diagram of a presence server according to an embodiment of the invention.

According to the location of the delegation check processing unit, referring to FIG. 5, an embodiment of the invention provides a presence server, which includes the delegation check processing unit.

Figure 6:
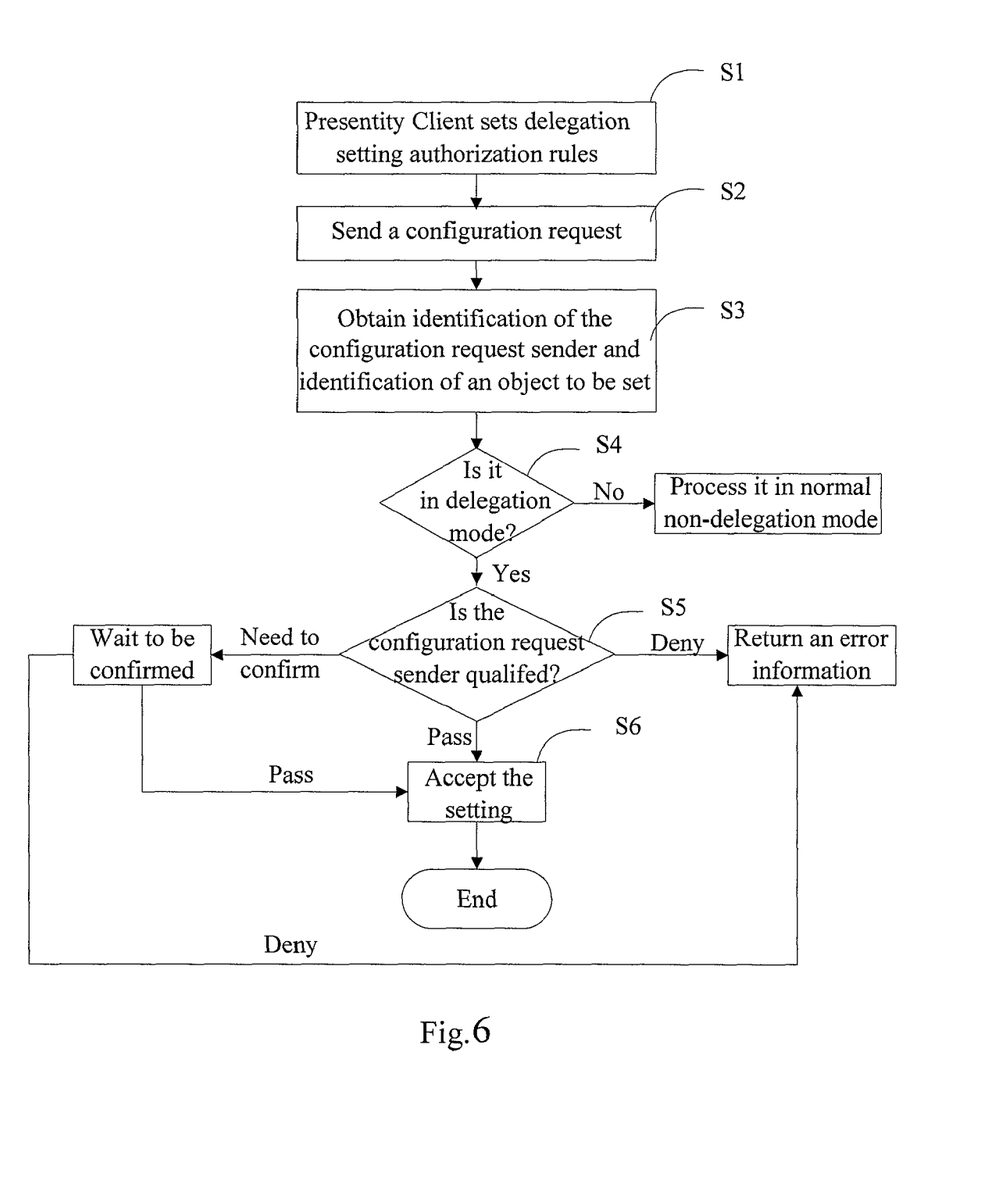
FIG. 6 is a flow chart illustrating processes of a method according to an embodiment of the invention.
Figure 7:
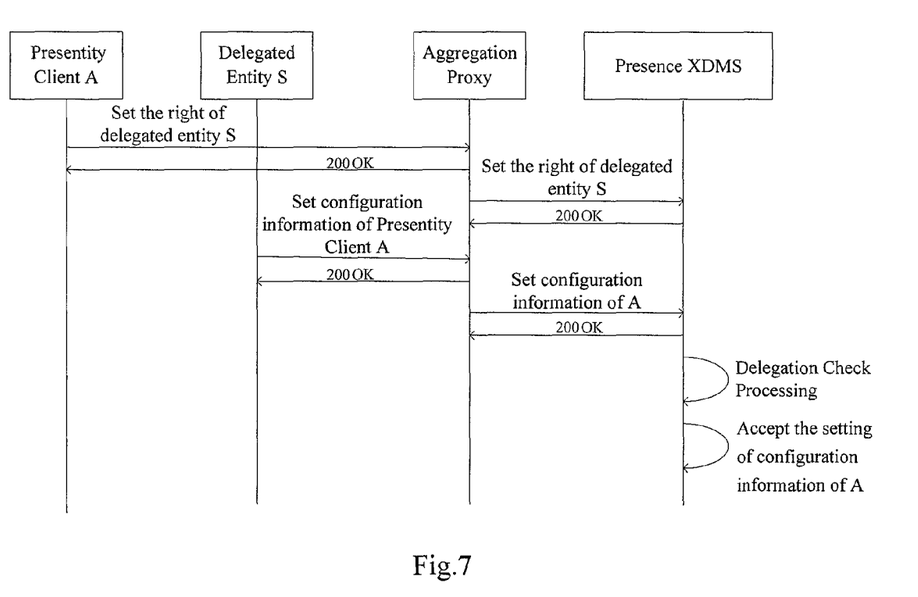
FIG. 7 is a flow chart illustrating signaling of a method according to an embodiment of the invention.

By means of the above system, one embodiment of the invention provides a method for setting configuration information of a presentity client, referring to FIG. 6 and FIG. 7, which includes the following processes:

S1: Set delegation setting authorization rules by a presentity client.

S2: Send a configuration request message by a configuration request message sender.

S3: Obtain identification of the configuration request message sender and identification of an object to be set.

S4: Determine whether the configuration request message is in delegation mode; if it is in delegation mode, perform S5; otherwise, process it in non-delegation mode, and the process ends.

S5: Check qualification of the configuration request message sender; if the configuration request message sender has the qualification and does not need to be confirmed, then perform S6; if the configuration request message sender has the qualification and needs to be confirmed, then perform S6 after being confirmed by the presentity client; if the presentity client denies, then return an error information; if the configuration request message sender does not has the qualification, then return an error information.

S6: Set the configuration information according to the configuration request message, and the process ends.

The method of the embodiment will now be described in detail in four examples, wherein the delegation check processing unit lies in a document management server (Presence XDMS) and the delegated entity lies in a presence service subscriber equipment.

Example 1

Subscriber A Delegates a Public Black List Server S to Set its Configuration Information so as to Block Specific Watchers S101: Set delegation setting authorization rules by a presentity client.

Subscriber A sets delegation setting authorization rules in a delegation check processing unit within a Presence XDMS via an XML Configuration Access Protocol (XCAP). The delegation setting authorization rules constitute a rule set for determining whether an entity has the right to set configuration information on behalf of subscriber A. The principles of the delegation setting authorization rules are described in Table 1:

TABLE 1

| Entity | Right (whether it can set configuration information on behalf of subscriber A) |
|---|---|
| Sip:blacklistserver@example.com | "Permitted" |
| Sip:otherserver@example.com | "Denied " |

Contents of a delegation setting authorization rule document include, but are not limited to, the contents shown in Table 1. For example, the contents of a delegation setting authorization rule document may further describe which entity may set which or which kind of configuration information on behalf of subscriber A.

In order to implement the setting of the delegation setting authorization rules, XML document architecture of the delegation setting authorization rules according to an embodiment of the invention may be XML document architecture of presence authorization rules. For example, when subscriber A delegates public black list server S (the address of the sip (Session Initiation Protocol) of public black list server S is: sip:blacklistserver@example.com) to set its configuration information, it may send a delegation setting authorization rules request to the Presence XDMS:

```
PUT
http://xcap.example.com/services/presence-xdms/users/sip:userA@example.co
m/pref_delegation_auth.xml HTTP/1.1
...
Content-Type: application/auth-policy+xml
Content-Length: (...)
<?xml version="1.0" encoding="UTF-8"?>
<cr:ruleset
    xmlns:op="urn:oma:params:xml:ns:pres-rules"
    xmlns:pr="urn:ietf:params:xml:ns:pres-rules"
    xmlns:cr="urn:ietf:params:xml:ns:common-policy"
    xmlns:xsi="http://www.w3.org/2001/XMLSchema-instance">
    <cr:rule id="ck81">
        <cr:conditions>
            <cr:identity>
                <cr:id>sip:blacklistserver@example.com</cr:id>
            </cr:identity>
        </cr:conditions>
        <cr:actions>
            <pr:sub-handling>allow</pr:sub-handling>
        </cr:actions>
        <cr:transformations>
            <pr:provide-services>
                <op:provide-willingness>true</op:provide-willingness>
                <pr:provide-status-icon>true</pr:provide-status-icon>
        </cr:transformations>
    </cr:rule>
</cr:ruleset>
```

Upon receiving the delegation setting authorization rules request, the Presence XDMS creates a document of delegation setting authorization rules.

Later, after public black list server S receives a delegate request from subscriber A, it may automatically set the configuration information on behalf of subscriber A when necessary.

S102: send a configuration request message by a configuration request message sender.

When public black list server S finds a new public malicious subscriber (such as an illegal organization), public black list server S will send a configuration request message in XCAP format to the Presence XDMS via an aggregation proxy. The configuration request message contains the configuration information to be set, that is, the configuration information for disabling the new public malicious subscriber to subscribe to and view the presence information of subscriber A.

S103: Obtain identification of the configuration request message sender and identification of an object to be set.

Upon receiving the configuration request message, the delegation check processing unit in the Presence XDMS obtains the identification of the configuration request message sender from the configuration request message, that is, the identification of public black list server S: sip:blacklistserver@example.com, and obtains the identification of the object to be set, i.e. the identification of subscriber A (such as, sip:baohongqing@example.com), according to the object to be set by the configuration request message.

S104: Determine whether the configuration request message is in delegation mode.

The delegation check processing unit determines whether the identification of the configuration request message sender consists with the identification of the object to be set. Apparently, they do not consist with each other in this example, so the delegation check processing unit determines that the configuration request message is in delegation mode.

S105: Check qualification of the configuration request message sender.

After the delegation check processing unit determines that the configuration request message is in delegation mode, it further checks whether the configuration request message sender (i.e., public black list server S) has the right to set the configuration information on behalf of subscriber A according to the delegation setting authorization rules stored in the delegation check processing unit set by subscriber A.

In this example, subscriber A has delegated public black list server S to set its configuration information (referring to the above Table 1), so the delegation check processing unit determines that public black list server S has the qualification to set configuration information on behalf of subscriber A.

S106: Set the configuration information according to the configuration request message, and the process ends.

The delegation check processing unit updates the configuration information of subscriber A with the configuration information contained in the configuration request message. Therefore, the presence information of subscriber A will not be subscribed to and viewed by the public malicious subscribers.

Example 2

Subscriber A Sets Configuration Information by Itself so as to Block Specific Watchers

S201: Set delegation setting authorization rules by a presentity client. (The same as S101)

S202: Send a configuration request message by a configuration request message sender.

When subscriber A finds a new public malicious subscriber (such as an illegal organization), subscriber A will send a configuration request message in XCAP format to the Presence XDMS via an aggregation proxy. The configuration request message contains the configuration information to be set, that is, the information for disabling the new public malicious subscriber to subscribe to and view the presence information of subscriber A.

S203: Obtain identification of the configuration request message sender and identification of an object to be set.

Upon receiving the configuration request message, the delegation check processing unit in the Presence XDMS obtains the identification of the configuration request message sender from the configuration request message, i.e., the identification of subscriber A: (such as, sip:baohongqing@example.com), and obtains the identification of the object to be set, i.e. the identification of subscriber A (such as: sip:baohongqing@example.com), according to the object to be set by the configuration request message.

S204: Determine whether the configuration request message is in delegation mode.

The delegation check processing unit determines whether the identification of the configuration request message sender consists with the identification of the object to be set. Apparently, they consist with each other in this example, so the configuration request message is in non-delegation mode. The subsequent processes will be processed according to the existing process, that is, skip process S205 and perform process 206 directly.

S205: Check qualification of the configuration request message sender.

S206: Set the configuration information according to the configuration request message, and the process ends.

The delegation check processing unit updates the configuration information of subscriber A with the configuration information contained in the configuration request message. Therefore, the presence information of subscriber A will not be subscribed to and viewed by the public malicious subscribers.

Example 3

Subscriber A Delegates Public Black List Server S to Set its Configuration Information so as to Block Specific Watchers, but such Setting Needs to be Confirmed by Subscribe A Before the Setting is Implemented

S301: Set delegation setting authorization rules by a presentity client.

Subscriber A sets delegation setting authorization rules in a delegation check processing unit within a Presence XDMS via an XCAR The delegation setting authorization rules constitute a rule set for determining whether an entity has the right to set configuration information on behalf of subscriber A. The principles of the delegation setting authorization rules are described in Table 2.

TABLE 2

| Entity | Right (whether it can set configuration information on behalf of subscriber A) |
|---|---|
| sip:blacklistserver@example.com | "permitted but need to be confirmed" |
| sip:otherserver@example.com | "denied" |

Contents of a delegation setting authorization rule document include, but are not limited to, the contents of Table 2. For example, the contents of a delegation setting authorization rule document may further describe which entity may set which or which kind of configuration information on behalf of subscriber A.

In order to implement the setting of the delegation setting authorization rules, XML document architecture of the delegation setting authorization rules according to an embodiment may be the XML document architecture of presence authorization rules. For example, when subscriber A delegates public black list server S (the sip address of public black list server S is: sip:blacklistserver@example.com) to set its configuration information, it may send a delegation setting authorization rules request to the Presence XDMS:

The delegation check processing unit determines, according to the delegation setting authorization rules stored in the delegation check processing unit, that subscriber A should confirm the setting of the configuration information before the setting of the configuration information is implemented. Next, a prompting message is sent to subscriber A according to the existing mechanism to request subscriber A to confirm.

If subscriber A confirms that the setting of the configuration information may be implemented, then the delegation check processing unit updates the configuration information of subscriber A with the configuration information contained in the configuration request message. Therefore, the presence information of subscriber A will not be subscribed to and viewed by the public malicious subscribers.

```
PUT
http://xcap.example.com/services/presence-xdms/users/sip:userA@example.co
m/pref_delegation_auth.xml HTTP/1.1
...
Content-Type: application/auth-policy+xml
Content-Length: (...)
<?xml version="1.0" encoding="UTF-8"?>
<cr:ruleset
    xmlns:op="urn:oma:params:xml:ns:pres-rules"
    xmlns:pr="urn:ietf:params:xml:ns:pres-rules"
    xmlns:cr="urn:ietf:params:xml:ns:common-policy"
    xmlns:xsi="http://www.w3.org/2001/XMLSchema-instance">
    <cr:rule id="ck81">
        <cr:conditions>
            <cr:identity>
                <cr:id>sip:blacklistserver@example.com</cr:id>
            </cr:identity>
        </cr:conditions>
        <cr:actions>
            <pr:sub-handling>confirm</pr:sub-handling>
        </cr:actions>
        <cr:transformations>
            <pr:provide-services>
                <op:provide-willingness>true</op:provide-willingness>
                <pr:provide-status-icon>true</pr:provide-status-icon>
        </cr:transformations>
    </cr:rule>
</cr:ruleset>
```

The delegation setting authorization rules request further includes content of requiring confirmation by subscriber A before the setting is implemented.

Upon receiving the delegation setting authorization rules request, the Presence XDMS creates a document of delegation setting authorization rules.

Later, after the public black list server S receives a delegate request from subscriber A, it may set the configuration information on behalf of subscriber A when necessary.

S302: send a configuration request message by a configuration request message sender. (The same as S102)

S303: Obtain identification of the configuration request sender and identification of an object to be set. (The same as S103)

S304: Determine whether the configuration request message is in delegation mode. (The same as S104)

S305: Check qualification of the configuration request message sender. (The same as S105)

S306: Set the configuration information according to the configuration request message, and the process ends.

Otherwise, the delegation check processing unit denies the setting.

Example 4

Subscriber A does not Delegate Public Black List Server S to Set its Configuration Information, but the Public Black List Server S Sends a Configuration Request S401: Set delegation setting authorization rules by a presentity client.

Subscriber A sets delegation setting authorization rules in a delegation check processing unit within a Presence XDMS via an XCAP. The delegation setting authorization rules constitute a rule set for determining whether an entity has the right to set configuration information on behalf of subscriber A. Principles of the delegation setting authorization rules are described in Table 3.

TABLE 3

| Entity | Right (whether it can set configuration information on behalf of subscriber A) |
| --- | --- |
| sip:blacklistserver@example.com | "denied" |
| sip:otherserver@example.com | "denied" |

Contents of a delegation setting authorization rule document include, but are not limited to, the contents of Table 3. For example, the contents of a delegation setting authorization rule document may further describe which entity may set which or which kind of configuration information on behalf of subscriber A.

Upon receiving a delegation setting authorization rules request, the Presence XDMS creates a document of delegation setting authorization rules.

S402: Send a configuration request message by a configuration request message sender. (The same as S102)

S403: Obtain identification of the configuration request message sender and identification of an object to be set. (The same as S103)

S404: Determine whether the configuration request message is in delegation mode. (The same as S104)

S405: Check qualification of the configuration request message sender.

After the delegation check processing unit determines that the configuration request message is in delegation mode, it further checks whether the configuration request message sender (i.e., public black list server S) has the right to set the configuration information on behalf of subscriber A according to the delegation setting authorization rules stored in the delegation check processing unit set by subscriber A.

In this example, subscriber A does not delegate public black list server S to set its configuration information (referring to the above Table 3), so the delegation check processing unit determines that public black list server S does not have the qualification to set the configuration information on behalf of subscriber A, and denies the setting of the configuration information. That is, skip S406, and the process ends.

S406, Set the configuration information according to the configuration request message, and the process ends.

Similarly, if the delegation check processing unit lies in a presence server or serves as a separate network element, the process will be the same as those of the above four embodiments, and its detailed description is omitted.

In addition, as for cases in which the delegated entity is not within a presence service subscriber equipment, i.e., the presentity client and the delegated entity are respectively connected with the delegation check processing unit, the presence server with the delegation check processing unit, or the document management server with the delegation check processing unit and interact with them directly without the need of the aggregation proxy, the processes will be the same as those of the above four embodiments, and thus detailed description is omitted.

The invention has the following beneficial effects:

Embodiments of the invention provide a method for setting configuration information of a presentity client, which includes: determining whether the configuration request message sent from a configuration request message sender is in delegation mode according to whether identification of a configuration request message sender consists with identification of an object to be set; if the configuration request message is in delegation mode, then further confirming qualification of the configuration request message sender according to delegation setting authorization rules set by the presentity client, and completing the setting of the configuration information according to the configuration request message.

To support the method of the invention, embodiments of the invention provide a system for setting configuration information of a presentity client, which includes a delegation check processing unit for determining whether a configuration request message sent from a configuration request message sender is in delegation mode and determining qualification of the configuration request message sender according to delegation setting authorization rules set by the presentity client, and accepting the configuration request message which is in delegation mode and sent by a qualified configuration request message sender.

In view of different locations of the delegation check processing unit, embodiments of the invention further provide a document management server and a presence server with the delegation check processing unit.

According to embodiments of the invention, the setting of configuration information will be more flexible and convenient, and a mechanism is provided for a presence service subscriber to delegate other entities to set its configuration information. Embodiments of the invention may be applicable for cases in which the setting of configuration information is relatively complex. A presence service subscriber may delegate other entities to set the configuration information. As a result, it is helpful for an application to automatically set the configuration information according to the presence service subscriber and environment.

According to embodiments of the invention, the setting of configuration information will be more flexible and convenient, and a mechanism is provided for a presence service subscriber to delegate other entities to set its configuration information. Embodiments of the invention may be applicable for cases in which the setting of configuration information is relatively complex. A presence service subscriber may delegate other entities to set the configuration information. As a result, it is helpful for an application to automatically set the configuration information according to the presence service subscriber and environment.

Apparently, those skilled in the art can make various variations and modifications without departing from the spirit or scope of the invention. If these variations and modifications fall within scopes as defined by the appended claims and their equivalents, the invention intends to cover these variations and modifications.

The invention claimed is:

1. A method for setting configuration information of a presentity client, comprising:
   setting, by the presentity client, delegation setting authorization rules;
   delegating, by the presentity client, a delegated entity of a presence service subscriber equipment;
   setting, by the delegated entity, configuration information of the presentity client;
   determining, by a delegation check hardware processing unit of a presence server, a configuration request message sent from a configuration request message sender is in delegation mode;
   confirming, by the processing unit of the server, qualification of the configuration request message sender according to the delegation setting authorization rules set by the presentity client;
   obtaining, by the processing unit of the server, confirmation from the presentity client through an aggregation proxy, and then setting the configuration information of the presentity client in the delegation mode according to the configuration request message; and the delegation setting authorization rules existing in a markup language comprising categories of the configuration information that the delegated entity is delegated to set.

2. The method according to claim 1, wherein determining a configuration request message sent from a configuration request message sender is in delegation mode comprises:
obtaining identification of the configuration request sender and identification of an object to be set;
determining the identification of the configuration request sender does not consist with the identification of the object to be set.

3. The method according to claim 2, wherein the identification of the configuration request sender and the identification of the object to be set are SIP addresses.

4. The method according to claim 2, wherein the delegation setting authorization rules comprise an SIP address of a delegated entity.

5. The method according to claim 4, wherein the delegation setting authorization rules further comprise categories of the configuration information that the delegated entity may be delegated to set.

6. The method according to claim 1, wherein the delegation setting authorization rules are presented in eXtensible Markup Language (XML) documents.

7. The method according to claim 1, further comprising after confirming qualification of the configuration request sender, obtaining confirmation from the presentity client before setting the configuration information of the presentity client.

8. The method according to claim 1, wherein if a delegated entity lies in a presence service subscriber equipment, the method is implemented by using an aggregation proxy.

9. A system for setting configuration information of a presentity client, comprising:
the presentity client, for setting delegation setting authorization rules and delegating a delegated entity of a presence service subscriber equipment to set configuration information of the presentity client;
the delegated entity, for setting configuration information of the presentity client;
a delegation check hardware processing unit of a presence server, for determining a configuration request message sent from a configuration request sender is in delegation mode, confirming qualification of the configuration request sender according to the delegation setting authorization rules, obtaining confirmation from the presentity client through an aggregation proxy, and then setting the configuration information of the presentity client according to the configuration request message and the delegation setting authorization rules existing in a markup language comprising categories of the configuration information that the delegated entity is delegated to set.

10. The system according to claim 9, wherein the delegation check processing unit is in an eXtensible Markup Language document management server (Presence XDMS) or in a presence server, or the delegation check processing unit is a separate network element.

11. The system according to claim 10, wherein when the delegated entity lies in a presence service subscriber equipment, the system further comprises an aggregation proxy, for enabling the presentity client or the delegated entity to interact with the delegation check processing unit.

12. The system according to claim 9, wherein when the delegated entity lies in a presence service subscriber equipment, the system further comprises an aggregation proxy for enabling the presentity client or the delegated entity to interact with the delegation check processing unit.

13. The system according to claim 12, wherein the delegation setting authorization rules comprise an SIP address of the delegated entity.

14. The system according to claim 13, wherein the delegation setting authorization rules further comprise categories of the configuration information that the delegated entity may be delegated to set.

15. The system according to claim 14, wherein the delegation setting authorization rules are presented in eXtensible Markup Language (XML) documents.

16. A document management presence server, which stores eXtensible Markup Language (XML) documents configured by a presentity client or a watcher client, the server comprises:
a delegation check hardware processing unit, for determining a configuration request message sent from a configuration request sender is in delegation mode, confirming qualification of the configuration request sender according to delegation setting authorization rules set by the presentity client, obtaining, by the processing unit of the server, confirmation from the presentity client through an aggregation proxy, and then setting the configuration information of the presentity client in the delegation mode according to the configuration request message, and the delegation setting authorization rules existing in a markup language comprising categories of the configuration information that a delegated entity of a presence service subscriber equipment is delegated to set;
the delegation setting authorization rules are set by the presentity client;
the delegated entity is delegated by the presentity client to set configuration information of the presentity client; and
the configuration information of the presentity client is set by the delegated entity.

17. A presence server, comprising:
a delegation check hardware processing unit, for determining a configuration request message sent from a configuration request sender is in delegation mode, confirming qualification of the configuration request sender according to delegation setting authorization rules set by a presentity client, obtaining, by the processing unit of the server, confirmation from the presentity client through an aggregation proxy, and then setting the configuration information of the presentity client in the delegation mode according to the configuration request message, and the delegation setting authorization rules existing in a markup language comprising categories of the configuration information that a delegated entity of a presence service subscriber equipment is delegated to set;
the delegation setting authorization rules are set by the presentity client;
the delegated entity is delegated by the presentity client to set configuration information of the presentity client; and
the configuration information of the presentity client is set by the delegated entity.

18. A delegation check processing unit of a document management presence server, comprising:
a hardware unit for determining a configuration request message sent from a configuration request sender is in delegation mode, confirming qualification of the configuration request sender according to delegation setting authorization rules set by a presentity client, obtaining, by the processing unit of the server, confirmation from the presentity client through an aggregation proxy, and then setting the configuration information of the presentity client in the delegation mode according to the configuration request message, and the delegation setting authorization rules existing in a markup language comprising categories of the configuration information that a delegated entity of a presence service subscriber equipment is delegated to set;

the delegation setting authorization rules are set by the presentity client;

the delegated entity is delegated by the presentity client to set configuration information of the presentity client; and the configuration information of the presentity client is set by the delegated entity.

19. The delegation check processing unit according to 18, wherein the delegation check processing unit is further used for obtaining confirmation from the presentity client before setting the configuration information of the presentity client.

20. The delegation check processing unit according to 18, wherein the delegation check processing unit is in an eXtensible Markup Language document management server (Presence XDMS) or in a presence server.

* * * * *

UNITED STATES PATENT AND TRADEMARK OFFICE
CERTIFICATE OF CORRECTION

PATENT NO. : 7,756,952 B2  Page 1 of 1
APPLICATION NO. : 11/690982
DATED : July 13, 2010
INVENTOR(S) : Hongqing Bao, Yang Zhao and Linyi Tian It is certified that error appears in the above-identified patent and that said Letters Patent is hereby corrected as shown below:

Column 8, line 54, delete "XCAR" and insert -- XCAP --.

Signed and Sealed this

Twelfth Day of October, 2010

David J. Kappos
*Director of the United States Patent and Trademark Office*